May 20, 1952 G. P. McCOUCH ET AL 2,597,358

PANORAMIC RECEIVER

Filed Feb. 18, 1946

IN FIGS. 1 AND 2 MIXER 15 MAY BE OMITTED IF AMPLIFIER 16 IS MADE NON-LINEAR

INVENTORS.
GORDON P. Mc COUCH
DONALD K. REYNOLDS
BY
William D. Hall
ATTORNEY

Patented May 20, 1952 2,597,358

UNITED STATES PATENT OFFICE 2,597,358

PANORAMIC RECEIVER

Gordon P. McCouch, Boonton, N. J., and Donald K. Reynolds, Cambridge, Mass., assignors to the United States of America as represented by the Secretary of War Application February 18, 1946, Serial No. 648,541

18 Claims. (Cl. 250—20)

Figure 1:
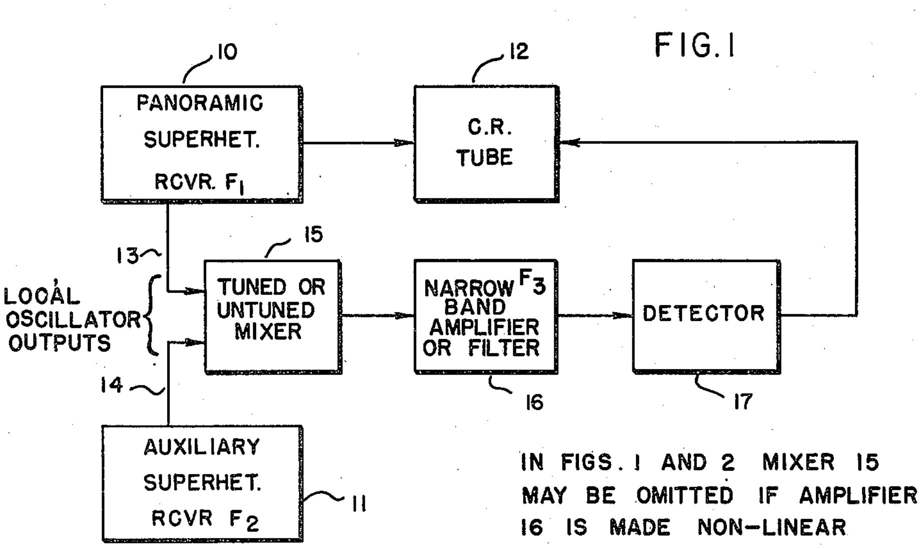

This invention relates to electrical apparatus and more particularly to panoramic receiving systems.

Panoramic receivers provide a visual display on a cathode ray tube of the signals present in a band of frequencies. Usually the signals appear as vertical pips on a horizontal base line which is laid out in frequency units.

In a former method of panoramic presentation, the so-called "panoramic adapter" has been used. The panoramic adapter is coupled into a standard superheterodyne receiver at a point between the mixer stage and the intermediate frequency amplifier of the standard receiver. The panoramic adapter itself includes a broad band amplifier having a double hump frequency response characteristic, a panoramic mixer having a frequency modulated local oscillator associated therewith, a narrow band intermediate frequency amplifier, a detector, an amplifier and a cathode ray tube. One set of deflection plates of the cathode ray tube is connected to the output of the amplifier and the other set of deflection plates is connected to a voltage which is a function of the instantaneous frequency of the frequency modulated local oscillator. Hence a panoramic presentation of the signals present in the mixer output of the standard receiver is displayed on the cathode ray tube. The double hump frequency response characteristic of the broad band amplifier of the panoramic adapter is intended to compensate for the sloping sides of the frequency response characteristic at the standard receiver mixer output. The resultant should be a fairly uniform frequency response characteristic (though limited frequency band) at the output of the broad band amplifier of the panoramic adapter.

There are several disadvantages in using the panoramic adapter. Inherently the panoramic presentation is confined to a fairly limited band of frequencies. In addition, tuning the standard receiver will alter the panoramic display, which is confusing and particularly undesirable where it is necessary to keep track of a number of different signals.

An object of the present invention is to provide a panoramic receiving system including two separate superheterodyne receivers, namely a panoramic superheterodyne receiver adapted to furnish a panoramic presentation on a cathode ray tube of the signals in a band of frequencies and a separate auxiliary listen-through superheterodyne receiver which may be tuned to any frequency within said band of frequencies.

A further object of the present invention is to provide an indication on said cathode ray tube of the frequency to which said auxiliary receiver is tuned.

Other objects and advantages of the invention will be apparent during the course of the following description.

The panoramic receiver and the auxiliary listen-through receiver are conventional superheterodyne receivers. The present invention is concerned primarily with various methods of providing an indication on the cathode ray tube of the frequency to which the auxiliary receiver is tuned.

There are three possible cases depending on the relation between the intermediate frequencies and the local oscillator frequencies of the two superheterodyne receivers:

1. Intermediate frequencies equal; local oscillators operate on same side of signal frequency band.
2. Intermediate frequencies unequal; local oscillators operate on same side of signal frequency band.
3. Intermediate frequencies equal or unequal; local oscillators operate on opposite sides of signal frequency band.

For each of these three cases, several alternative methods are considered for indicating the frequency setting of the auxiliary receiver on the panoramic receiver cathode ray tube.

In case 1, the local oscillator outputs of the two receivers may be heterodyned, and the occurrence of the null frequency point between said outputs may be utilized for indicating the frequency setting of the auxiliary receiver. In another method, which is the preferred method, the local oscillator outputs are heterodyned and the occurrence of two frequencies straddling the null frequency point may be utilized for indicating the frequency setting of the auxiliary receiver.

In case 2 the local oscillator outputs may be heterodyned, and the occurence of the frequency which is the difference frequency between the intermediate frequencies of the two receivers may be utilized for indicating the frequency setting of the auxiliary receiver. In another less preferable method, a frequency converter having a fixed frequency local oscillator tuned to said difference frequency may be inserted in series with the output from one of said local oscillators, in which event the methods of case 1 may be utilized.

In case 3 the local oscillator outputs may be heterodyned and the occurrence of the frequency which is the sum frequency of the intermediate frequencies of the two receivers may be utilized for indicating the frequency setting of the auxiliary receiver. In another less preferable method, a frequency converter having a fixed frequency local oscillator tuned to said sum frequency may be inserted in series with the output from one of said local oscillators, in which event the methods of case 1 may be utilized.

Figure 2:
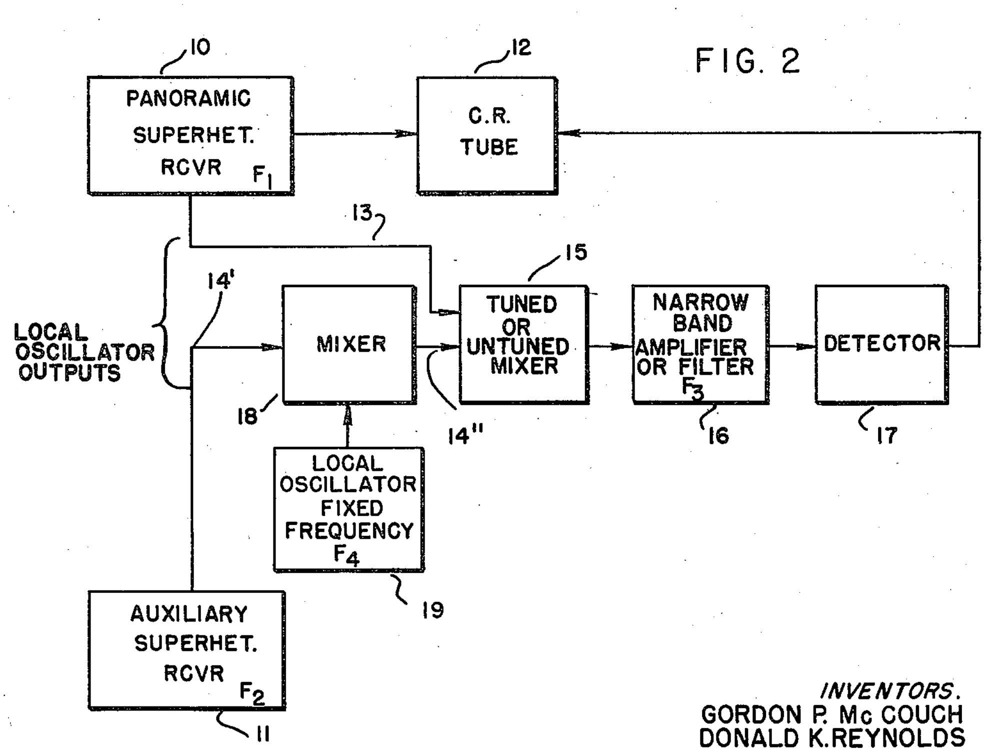

In the accompanying drawing forming a part of this specification, Fig. 1 is a block diagram illustrating the preferred embodiment of the present invention and is applicable to cases 1, 2 and 3 while Fig. 2 is a block diagram illustrating another embodiment of the present invention which is applicable to cases 2 and 3.

In Fig. 1, numeral 10 designates a panoramic superheterodyne receiver for a band of frequencies. Numeral 11 designates an auxiliary listen-through superheterodyne receiver which may be tuned to any frequency within said band of frequencies.

The intermediate frequencies of the panoramic superheterodyne receiver and of the auxiliary superheterodyne receiver are designated as $F_1$, and $F_2$ respectively.

The panoramic superheterodyne receiver 10 is equivalent to the ordinary superheterodyne receiver except for its mixer and local oscillator. The panoramic superheterodyne receiver 10 has a mixer stage with a frequency modulated local oscillator. The output of panoramic receiver 10 is electrically connected to one set of deflection plates of a cathode ray tube 12. The other set of deflection plates of the cathode ray tube 12 is electrically connected to a voltage which is a function of the instantaneous frequency of the frequency modulated local oscillator.

Numerals 13 and 14 designate electrical connections from the local oscillators of panoramic receiver 10 and auxiliary receiver 11 respectively to a frequency mixing circuit 15. A narrow band amplifier 16, is electrically connected to the output of frequency mixing circuit 15. The frequency to which amplifier 16 is tuned is designated as $F_3$. A detector 17 is electrically connected to the output of amplifier 16. The output of detector 17 is electrically coupled to cathode ray tube 12.

Fig. 2 is identical with Fig. 1 except that a frequency conversion circuit 18 having a fixed frequency local oscillator 19 is inserted in series with either electrical connection 13 or electrical connection 14. The frequency of oscillator 19 is designated as $F_4$.

Although the frequency conversion circuit 18 and its associated local oscillator 19 are shown in Fig. 2 as inserted in the electrical connection 14′—14″ from the local oscillator auxiliary receiver 11 to mixing circuit 15, it is to be understood that they may be inserted equally well in the connection from the local oscillator of panoramic receiver 10 to frequency mixing circuit 15 if desired.

The values of $F_3$ and $F_4$ for each of the three cases mentioned above will now be considered.

(1) For $F_1=F_2$ and the local oscillators of both receivers operating on the same side of the signal band of frequencies, there are two possible values for $F_3$ depending upon which method is used:

(a). $F_3$ may be some intermediate frequency, comparatively small with respect to the band of frequencies presented on cathode ray tube 12. In this method a double pip will be obtained on cathode ray tube 12. The two pips will straddle the frequency setting of the auxiliary receiver, each pip being $F_3$ frequency units displaced from said frequency setting. This is the preferred method for case 1.

(b). $F_3$ may be approximately zero (i. e. amplifier 16 may be an audio amplifier). In this method a single pip appears on cathode ray tube 12 at the frequency to which the auxiliary receiver is tuned. This method is the less preferable method for case 1.

(2) For $F_1 \neq F_2$ and the local oscillators of both receivers operating on the same side of the signal band, then for the preferred embodiment shown in Fig. 1, $F_3$ is the difference frequency between $F_1$ and $F_2$. For the other embodiment, shown in Fig. 2, $F_4$ is the difference frequency between $F_1$ and $F_2$, while $F_3$ is determined as under case 1.

(3) For $F_1=F_2$ or $F_1 \neq F_2$ and the local oscillators operating on opposite sides of the signal band, then for the preferred embodiment shown in Fig. 1, $F_3$ is the sum of $F_1$ and $F_2$. For the other embodiment, shown in Fig. 2, $F_4$ is the sum of $F_1$ and $F_2$, while $F_3$ is determined as under case 1.

It is to be understood that the frequency mixing circuit 15 and amplifier 16 may be replaced by various equivalents. Thus amplifier 16 may be replaced by a band pass filter having a similar frequency response characteristic. Inasmuch as the frequency mixing circuit 15 is essentially a non-linear circuit, the frequency mixing circuit 15 and the amplifier 16 could be combined and their function served by a single non-linear narrow band amplifier.

The presentation of the indicator signal may be made in various ways:

1. Pips in the same direction as signal pips on cathode ray tube 12.
2. Pips in opposite direction to signal pips on cathode ray tube 12.
3. Trace brightening of cathode ray tube 12.
4. Trace darkening of cathode ray tube 12.

Presentations 1 and 2 may be obtained by applying the output of detector 17 (with proper polarity) to the appropriate set of deflection plates of cathode ray tube 12. In presentations 3 and 4, the output of detector 17 (with proper polarity) is applied to the grid-cathode circuit of cathode ray tube 12.

This panoramic receiving system has several important advantages:

1. A detailed study of any signal or signals selected from the panoramically presented band of frequencies may be made without interruption or without interfering with the panoramic presentation during the listening period.
2. Rapid shifting of the auxiliary receiver to new frequencies or the following of signals shifting in frequency is possible.
3. Accurate alignment of the tuning of the auxiliary receiver with that of the signal under investigation is possible.

It will be apparent that there may be deviations from the invention as described which still fall fairly within the spirit and scope of the invention.

Accordingly we claim all such deviations which fall fairly within the spirit and scope of the invention as identified in the hereinafter appended claims.

What is claimed is:

1. A panoramic receiving system for a band of frequencies including a panoramic superheterodyne receiver for said band of frequencies, a cathode ray tube electrically connected to the output of said panoramic superheterodyne receiver, an auxiliary superheterodyne receiver adapted to be tuned over said band of frequencies, the intermediate frequencies of said receivers being unequal and the local oscillators of said receivers operating on the same side of said band of frequencies, a non-linear circuit electrically connected to the outputs of said local oscillators and adapted to furnish the difference frequency between the intermediate frequencies of said receivers, detecting means for rectifying the output of said non-linear circuit and means for electrically coupling the output of said detecting means to said cathode ray tube.

2. A panoramic receiving system as in claim 1 in which said non-linear circuit includes a frequency mixing circuit and a narrow band amplifier tuned to said difference frequency and electrically connected to the output of said frequency mixing circuit.

3. A panoramic receiving system as in claim 1 in which said non-linear circuit includes a frequency mixing circuit and a band pass filter tuned to said difference frequency and electrically connected to the output of said frequency mixing circuit.

4. A panoramic receiving system as in claim 1 in which said non-linear circuit includes a non-linear narrow band amplifier tuned to said difference frequency.

5. A panoramic receiving system for a band of frequencies including a panoramic superheterodyne receiver for said band of frequencies, a cathode ray tube electrically connected to the output of said panoramic superheterodyne receiver, an auxiliary superheterodyne receiver adapted to be tuned over said band of frequencies, the intermediate frequencies of said receivers being unequal, the local oscillators of said receivers operating on opposite sides of said band of frequencies, a non-linear circuit electrically connected to the outputs of said local oscillators and adapted to furnish the sum frequency of the intermediate frequencies of said receivers, detecting means for rectifying the output of said non-linear circuit and means for electrically coupling the output of said detecting means to said cathode ray tube.

6. A panoramic receiving system as in claim 5 in which said non-linear circuit includes a frequency mixing circuit and a narrow band amplifier tuned to said sum frequency and electrically connected to the output of said frequency mixing circuit.

7. A panoramic receiving system as in claim 5 in which said non-linear circuit includes a frequency mixing circuit and a band pass filter tuned to said sum frequency and electrically connected to the output of said frequency mixing circuit.

8. A panoramic receiving system as in claim 5 in which said non-linear circuit includes a non-linear narrow band amplifier tuned to said sum frequency.

9. A panoramic receiving system for a band of frequencies including a panoramic superheterodyne receiver for said band of frequencies, a cathode ray tube electrically connected to the output of said panoramic superheterodyne receiver, an auxilarly superheterodyne receiver adapted to be tuned over said band of frequencies, the intermediate frequencies of said receivers being unequal and the local oscillators of said receivers operating on the same side of said band of frequencies, a frequency conversion circuit electrically connected to the output of the local oscillator of one of said receivers, a fixed frequency oscillator connected to said frequency conversion circuit and tuned to the difference frequency between the intermediate frequencies of said receivers, a non-linear circuit electrically connected to the output of said frequency conversion circuit and to the output of the other of said local oscillators, detecting means electrically connected to the output of said non-linear circuit and means for electrically coupling the output of said detecting means to said cathode ray tube.

10. A panoramic receiving system as in claim 9 in which said non-linear circuit includes a frequency mixing circuit and a narrow band intermediate frequency amplifier electrically connected to the output of said frequency mixing circuit.

11. A panoramic receiving system as in claim 9 in which said non-linear circuit includes a non-linear narrow band intermediate frequency amplifier.

12. A panoramic receiving system for a band of frequencies including a panoramic superheterodyne receiver for said band of frequencies, a cathode ray tube electrically connected to the output of said panoramic superheterodyne receiver, an auxiliary superheterodyne receiver adapted to be tuned over said band of frequencies, the intermediate frequencies of said receivers being unequal, the local oscillators of said receivers operating on opposite sides of said band of frequencies, a frequency conversion circuit electrically connected to the output of the local oscillator of one of said receivers, a fixed frequency oscillator associated with said frequency conversion circuit and tuned to the sum frequency of the intermediate frequencies of said receivers, a non-linear circuit electrically connected to the output of said frequency conversion circuit and to the output of the other of said local oscillators, detecting means electrically connected to the output of said non-linear circuit and means for electrically coupling the output of said detecting means to said cathode ray tube.

13. A panoramic receiving system as in claim 12 in which said nonlinear circuit includes a frequency mixing circuit and a narrow band intermediate frequency amplifier electrically connected to the output of said frequency mixing circuit.

14. A panoramic receiving system for a band of frequencies, including a panoramic superheterodyne receiver for said band of frequencies, a cathode ray tube electrically connected to the output of said panoramic receiver, an auxiliary superheterodyne receiver tunable over the said band of frequencies, the intermediate frequencies of said receivers being unequal, a non-linear circuit means electrically connected to the outputs of the local oscillators of said receivers for deriving a beat frequency signal from the outputs of said oscillators, detecting means for rectifying the output of said non-linear circuit means, and means for electrically coupling the output of said detecting means to said cathode ray tube.

15. The system defined in claim 14, wherein the said local oscillators operate on the same side of said band of frequencies.

16. The system defined in claim 14, wherein said non-linear circuit means includes a frequency mixing circuit and an amplifier tuned to said beat frequency and electrically connected to the output of said frequency mixing circuit.

17. The system defined in claim 14, wherein the local oscillators of said receivers operate on the same side of said band of frequencies and said non-linear circuit means includes a frequency mixing circuit and a band pass filter tuned to the difference frequency between the intermediate frequencies of said receivers.

18. A panoramic receiving system for a band of frequencies, including a panoramic superheterodyne receiver for said band of frequencies, a cathode ray tube electrically connected to the output of said panoramic receiver, an auxiliary superheterodyne receiver tunable over the said band of frequencies, the intermediate frequencies of said receivers being unequal, a non-linear circuit means electrically connected to the outputs of the local oscillators of said receivers for deriving a beat frequency signal from said outputs having a frequency equal to the difference between the frequencies of said oscillators, detecting means for rectifying the output of said non-linear circuit means, and means for electrically coupling the output of said detecting means to said cathode ray tube.

GORDON P. McCOUCH.
DONALD K. REYNOLDS.

REFERENCES CITED

The following references are of record in the file of this patent:

UNITED STATES PATENTS

| Number | Name | Date |
| --- | --- | --- |
| 2,367,907 | Wallace | Jan. 23, 1945 |